US012051553B2

(12) United States Patent
Alberto et al.

(10) Patent No.: US 12,051,553 B2
(45) Date of Patent: Jul. 30, 2024

(54) SWITCHING DEVICE FOR A MEDIUM VOLTAGE ELECTRICAL CIRCUIT

(71) Applicant: Schneider Electric Industries SAS, Rueil Malmaison (FR)

(72) Inventors: Diego Alberto, Corenc (FR); Philippe Brun, Bernin (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 92 days.

(21) Appl. No.: 17/869,822

(22) Filed: Jul. 21, 2022

(65) Prior Publication Data

US 2023/0025832 A1 Jan. 26, 2023

(30) Foreign Application Priority Data

Jul. 23, 2021 (FR) .................................. FR2108042

(51) Int. Cl.

*H01H 1/00* (2006.01)
*H01H 33/666* (2006.01)
*H01H 71/04* (2006.01)

(52) U.S. Cl.

CPC ........ *H01H 33/666* (2013.01); *H01H 1/0015* (2013.01); *H01H 71/04* (2013.01); *H01H 2071/044* (2013.01)

(58) Field of Classification Search

CPC .. H01H 1/0015; H01H 7/04; H01H 2071/044; H01H 33/666; H01H 33/59; H01H 11/0062; H01H 2011/0075

(Continued)

(56) References Cited

U.S. PATENT DOCUMENTS 3,925,722 A * 12/1975 Fohrhaltz ............. G01R 27/205 324/415
6,002,560 A * 12/1999 Nguyen ............... H01H 1/0015 361/115

(Continued)

FOREIGN PATENT DOCUMENTS

DE 10260248 A1 7/2004
DE 10260258 A1 7/2004

OTHER PUBLICATIONS

French Search Report and Written Opinion dated Apr. 22, 2022 for corresponding French Patent Application No. FR2108042, 9 pages.

*Primary Examiner* — William A Bolton
(74) *Attorney, Agent, or Firm* — Locke Lord LLP

(57) ABSTRACT

A method for determining an operational status of a switching device for switching an electrical unit including a first circuit and a second circuit, each circuit respectively including: a vacuum breaker including a fixed electrode and a mobile electrode; and a control device connected to the mobile electrode via an elastic device. The method including: for each of the first and second circuits, determining a transition instant at which the mobile electrode comes into contact with the fixed electrode; determining a difference between the transition instant of the first vacuum breaker and the transition instant of the second vacuum breaker; determining that the operational status is a first status known as "nominal synchronization" if the difference is less than a threshold; and determining that the operational status is a second status known as "abnormal synchronization" if the difference is greater than the threshold.

14 Claims, 6 Drawing Sheets

(58) Field of Classification Search
USPC .......................... 218/140, 120, 146, 153, 154
See application file for complete search history.

(56) References Cited

U.S. PATENT DOCUMENTS

| | | | | | |
|---|---|---|---|---|---|
| 6,150,625 | A * | 11/2000 | Marchand | ............ | H01H 1/0015 218/118 |
| 9,633,808 | B2 * | 4/2017 | Ricciuti | ............... | H01H 1/0015 |
| 10,147,572 | B2 * | 12/2018 | Huo | ................... | H01H 33/6606 |
| 2009/0144019 | A1 | 6/2009 | Elsner et al. | | |
| 2020/0194191 | A1 * | 6/2020 | Ashtekar | ............ | G01R 31/3333 |

* cited by examiner

SWITCHING DEVICE FOR A MEDIUM VOLTAGE ELECTRICAL CIRCUIT

TECHNICAL FIELD

The present description relates to the technical field of switching devices for medium voltage electrical circuits. In this document, the term "medium voltage" is used in its normally accepted sense, namely as meaning a voltage higher than 1000 volts AC and higher than 1500 volts DC, but not exceeding 52 000 volts AC or 75 000 volts DC. The electrical unit comprises three circuits, each one connected to one phase of an electrical power network. The passage of current in each of the three circuits may be interrupted by means of the switching device. The disclosure relates in particular to switching devices in which the current is switched by the opening of a vacuum breaker placed in series in each of the circuits that is to be interrupted.

PRIOR ART

A vacuum breaker comprises a mobile electrode connected to a control link. The control link is connected to a control lever. The control lever is able to move between two extreme positions defining a constant actuating travel. When the control lever is actuated, the link is moved and separates the mobile electrode from the fixed electrode; this opens the circuit.

When the circuit is closed, there needs to be enough contact pressure between the two electrodes of the vacuum breaker to withstand the forces of mutual repulsion that are caused by the passage of the current. In order to ensure this contact pressure, there is a spring in the kinematic connection between the control lever and the link, and the travel of the control lever is greater than the minimum travel needed to bring the electrodes of the vacuum breaker into contact with one another. The overtravel therefore allows the spring to be compressed and thus apply a preload that ensures the desired minimum contact pressure. A position sensor makes it possible to determine the relative position of the link with respect to the control lever. The amplitude of the overtravel that allows the spring to be compressed can thus be determined. The position sensor thus allows a check that the overtravel remains sufficient during the course of use of the switching device, despite the wearing of the contacts of the electrodes of the vacuum breaker.

The action of the control levers of the various circuits is synchronized in such a way that the switching of the current in each phase of the circuit is a simultaneous as possible. Thus, the switching device is set up, at the time of its manufacture, so that the instants of opening of the various circuits, and the instants of closure of the various circuits, are synchronized.

However, the travel needed to bring the electrodes of the vacuum breaker into contact with one another changes over the course of time because of the erosion of the contacts as the switching device is progressively used. In addition, the mechanical clearances between the various moving parts can evolve differently between the various circuits. As a result, the switching of the current in the circuit for one phase may occur with a time shift compared with the switching of the current in the circuit of another phase. A small time shift does not present any particular problem, but too great a time shift is liable to damage the equipment connected to the circuits. It is known practice to perform checks on the synchronization of the various circuits during phases in which the switching device is taken out of service, such as, for example, during scheduled maintenance stoppages. These stoppages allow temporary intervention of sophisticated measurement instruments so that the equipment can be diagnosed.

The object is to provide a solution that allows defective synchronization between the closings and openings of the circuit of the different phases to be detected during normal use. What is meant by normal use is that no particular stoppage is required. In addition, the temporary addition of specific measurement instruments can be avoided since the proposed solution uses only measurement sensors that are already present for performing at least one other function.

SUMMARY

To this end, the present description proposes a method for determining an operational status of a switching device for switching an electrical unit comprising a first circuit connected to a first phase of an electrical network and a second circuit connected to a second phase of the electrical network, each circuit respectively comprising:

- a vacuum breaker placed in series in the circuit, the vacuum breaker comprising a fixed electrode and a mobile electrode able to move between a position of maximum opening and a closed position,
- a control device kinematically connected to the mobile electrode via an elastic return device, wherein each circuit comprises a position measuring device configured to measure a relative distance between the control device and the mobile electrode, the method comprising the steps:

- for each of the first and second circuits, when the control device causes the mobile electrode to pass from the position of maximum opening to the closed position, determining, from the measurements of the relative distance between the control device and the mobile electrode, a first transition instant at which the mobile electrode comes into contact with the fixed electrode,
- determining a difference between the first transition instant of the first vacuum breaker and the first transition instant of the second vacuum breaker,
- determining that the operational status is a first status known as "nominal synchronization" if the difference is less than or equal to a first predetermined threshold,
- determining that the operational status is a second status known as "abnormal synchronization" if the difference is greater than the first predetermined threshold.

As long as the time shift between the first transition instant of the first vacuum breaker and the first transition instant of the second vacuum breaker is sufficiently small, it is considered that the operational status of the switching device is nominal, which is to say that the synchronization of the switching device is nominal. In other words, the switching device is exhibiting no fault. When the time shift between the first transition instant of the first vacuum breaker and the first transition instant of the second vacuum breaker is greater than a threshold, which is to say too high, it is considered that the synchronization of the device is abnormal. Thus, the switching device is displaying degraded operation. From this determination of the operational status of the switching device, corrective action can be taken in order to return to nominal operation.

The features listed in the paragraphs which follow can be implemented independently of one another or in any technically possible combination:

The elastic return device is a spring. The elastic return device may be a helical spring.

According to one embodiment, the method further comprises the steps:

for each of the first and second circuits, when the control device causes the mobile electrode to pass from the closed position to the open position, determining a second transition instant at which the mobile electrode ceases to be in contact with the fixed electrode, determining a difference between the second transition instant of the first vacuum breaker and the second transition instant of the second vacuum breaker, determining that the operational status is a first status known as "nominal synchronization" if the difference is less than or equal to a second predetermined threshold, determining that the operational status is a second status known as "abnormal synchronization" if the difference is greater than the second predetermined threshold.

According to one exemplary embodiment of the method, the first predetermined threshold is comprised between 22.5% and 25% of an electrical network voltage variation period.

The second predetermined threshold is comprised between 15.0% and 16.5% of an electrical network voltage variation period.

The control device is able to move between:

a first extreme position in which the mobile electrode is in the position of maximum opening, the mobile electrode and the fixed electrode then being distant from one another by an opening distance, and a second extreme position in which the mobile electrode and the fixed electrode are in contact, a movement from the first extreme position to the second extreme position defining a travel of the control device, and the travel of the control device is greater than the opening distance so that the elastic return device is compressed when the control device is in the second extreme position.

The control device is connected to an actuating lever that is able to rotate about an axis.

The direction of the axis of rotation of the actuating lever is perpendicular to the direction of the longitudinal axis of the vacuum breaker.

The actuating lever is connected to the control device by a pivot. The pivot is secured to the control device.

The pivot extends along an axis perpendicular to the longitudinal axis and perpendicular to the direction of the axis of rotation of the actuating lever.

According to one embodiment, the method further comprises the steps:

for each circuit successively acquiring a set of samples of the relative distance between the control device and the mobile electrode, determining the mean and the standard deviation of the set of samples acquired, determining an absolute value of the difference between the last sample acquired and the determined mean, determining the quotient of the determined difference and of the determined standard deviation, determining an instant, known as threshold instant, at which the determined quotient becomes greater than a third predetermined threshold.

The third predetermined threshold is greater than 7. The third predetermined threshold is for example equal to 8.

The method may comprise the step:

attributing the value of the threshold instant to the first transition instant.

The method may further comprise the steps:

determining an equation of a first regression curve for all of the samples acquired between an instant corresponding to the threshold instant minus a first predetermined duration, and an instant corresponding to the threshold instant.

For example, the first predetermined duration is comprised between 8 ms and 12 ms, preferably equal to 10 ms.

According to one exemplary embodiment of the method, the first regression curve is a first linear regression line.

The method may further comprise the steps:

determining an equation of a second regression curve for all of the samples acquired between an instant corresponding to the threshold instant, and an instant corresponding to the threshold instant plus a second predetermined duration.

For example, a second predetermined duration is comprised between 0.8 ms and 1.2 ms, and preferably equal to 1 ms.

The second regression curve may be a second linear regression line.

The disclosure also relates to a method for determining an operational status of a switching device for switching an electrical unit comprising a first circuit connected to a first phase of an electrical network and a second circuit connected to a second phase of the electrical network, and a third circuit connected to a third phase of the electrical network, each circuit respectively comprising:

a vacuum breaker placed in series in the circuit, the vacuum breaker comprising a fixed electrode and a mobile electrode able to move between a position of maximum opening and a closed position, a control device kinematically connected to the mobile electrode via an elastic return device, the method comprising the steps:

for each of the first, second and third circuits, when the control device causes the mobile electrode to pass from the position of maximum opening to the closed position, determining a first transition instant at which the mobile electrode comes into contact with the fixed electrode, determining a first difference between the first transition instant of the vacuum breaker of the first circuit and the first transition instant of the vacuum breaker of the second circuit, determining a second difference between the first transition instant of the vacuum breaker of the second circuit and the first transition instant of the vacuum breaker of the third circuit, determining a third difference between the first transition instant of the vacuum breaker of the third circuit and the first transition instant of the vacuum breaker of the first circuit, determining that the operational status is a first status known as "normal synchronization" if the first difference, the second difference and the third difference are all less than or equal to a first predetermined threshold, determining that the operational status is a second status known as "abnormal synchronization" if at least one of the first difference, second difference and third difference is greater than the first predetermined threshold.

The disclosure also relates to a method further comprising the steps:

for each of the first, second and third circuits, when the control device causes the mobile electrode to pass from the closed position to the open position, determining a second transition instant at which the mobile electrode ceases to be in contact with the fixed electrode, determining a fourth difference between the second transition instant of the vacuum breaker of the first circuit and the second transition instant of the vacuum breaker of the second circuit, determining a fifth difference between the second transition instant of the vacuum breaker of the second circuit and the second transition instant of the vacuum breaker of the third circuit, determining a sixth difference between the second transition instant of the vacuum breaker of the third circuit and the second transition instant of the vacuum breaker of the first circuit.

determining that the operational status is a first status known as "nominal synchronization" if the fourth difference, the fifth difference and the sixth difference are all less than or equal to a second predetermined threshold, determining that the operational status is a second status known as "abnormal synchronization" if at least one of the fourth difference, fifth difference and sixth difference is greater than the second predetermined threshold.

According to one embodiment, the method further comprises the steps:

if the determined operational status is the second status known as "abnormal synchronization", emitting an alert signal.

The alert signal emitted may be the displaying of a message on a monitoring screen, or the illuminating of an indicator lamp, or the emission of an audible signal.

The disclosure also relates to an assembly comprising:

a switching device for switching an electrical unit comprising a first circuit connected to a first phase of an electrical network and a second circuit connected to a second phase of the electrical network, each circuit respectively comprising:

a vacuum breaker placed in series in the circuit, the vacuum breaker comprising a fixed electrode and a mobile electrode able to move between a position of maximum opening and a closed position, a control device kinematically connected to the mobile electrode via an elastic return device, an electronic monitoring unit configured to implement a method comprising the steps:

for each of the first and second circuits, when the control device causes the mobile electrode to pass from the position of maximum opening to the closed position, determining a first transition instant at which the mobile electrode comes into contact with the fixed electrode, determining a difference between the first transition instant of the first vacuum breaker and the first transition instant of the second vacuum breaker, determining that the operational status is a first status known as "nominal synchronization" if the difference is less than or equal to a first predetermined threshold, determining that the operational status is a second status known as "abnormal synchronization" if the difference is greater than the first predetermined threshold.

BRIEF DESCRIPTION OF THE DRAWINGS

Further features, details and advantages will become apparent from reading the following detailed description and from studying the attached drawings, in which.

DESCRIPTION OF THE EMBODIMENTS

In order to make the figures easier to read, the various elements are not necessarily drawn to scale. In these figures, identical elements bear the same references. Certain elements or parameters may be indexed, which is to say referred to for example as a first element or a second element, or else first parameter and second parameter, etc. This indexing is intended to differentiate between elements or parameters which are similar but not identical. This indexing does not imply that one element or parameter takes priority over another and the denominations are interchangeable. When it is specified that a subsystem comprises a given element, that does not exclude there being other elements in that subsystem. Likewise, when it is specified that a subsystem comprises a given element, it must be understood that the subsystem comprises at least that element.

Figure 1:
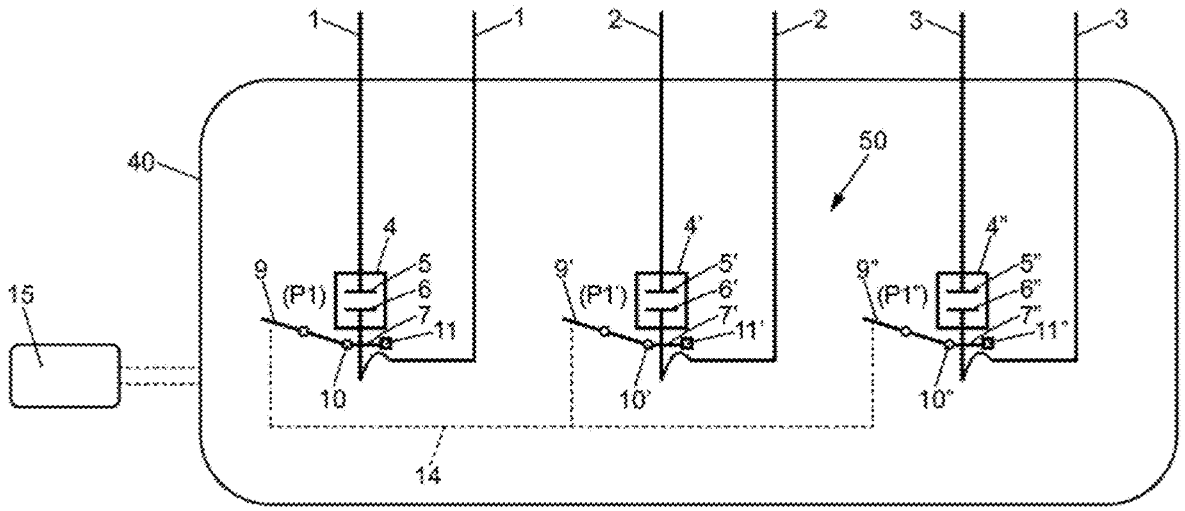
FIG. 1 is a schematic view of a switching device for switching a three-pole electrical unit.

FIG. 1 depicts an assembly comprising:

a switching device 50 for switching an electrical unit 40 comprising a first circuit 1 connected to a first phase of an electrical network and a second circuit 2 connected to a second phase of the electrical network, each circuit 1, 2 respectively comprising:

a vacuum breaker 4, 4' placed in series in the circuit, the vacuum breaker 4, 4' comprising a fixed electrode 5, 5' and a mobile electrode 6, 6' able to move between a position P1, P1' of maximum opening and a closed position P2, P2', a control device 7, 7' kinematically connected to the mobile electrode 6, 6' via an elastic return device 8, 8', an electronic monitoring unit 15 configured to implement the method according to the invention.

The method according to the invention is a method for determining an operational status of a switching device 50 for switching an electrical unit 40 comprising a first circuit 1 connected to a first phase of an electrical network and a second circuit 2 connected to a second phase of the electrical network, each circuit 1, 2 respectively comprising:

a vacuum breaker 4, 4' placed in series in the circuit, the vacuum breaker 4, 4' comprising a fixed electrode 5, 5' and a mobile electrode 6, 6' able to move between a position P1, P1' of maximum opening and a closed position P2, P2', a control device 7, 7' kinematically connected to the mobile electrode 6, 6' via an elastic return device 8, 8', wherein each circuit 1,2 comprises a position measuring device 11, 11' configured to measure a relative distance D-r between the control device 7, 7' and the mobile electrode 6, 6', the method comprising the steps:

for each of the first 1 and second 2 circuits, when the control device 7, 7' causes the mobile electrode 6, 6' to pass from the position P1, P1' of maximum opening to the closed position P2, P2', determining, from the measurements of the relative distance D-r between the control device 7, 7' and the mobile electrode 6, 6' a first transition instant t1, t1' at which the mobile electrode 6, 6' comes into contact with the fixed electrode 5, 5', determining a difference delta1 between the first transition instant t1 of the first vacuum breaker 4 and the first transition instant t1' of the second vacuum breaker 4', determining that the operational status is a first status known as "nominal synchronization" if the difference delta1 is less than or equal to a first determined threshold s1, determining that the operational status is a second status known as "abnormal synchronization" if the difference is greater than the first predetermined threshold s1. (Step 50)

The first transition instant t1 corresponds to the instant at which the mobile electrode 6 of the vacuum breaker 4 of the first circuit 1 comes into contact with the fixed electrode 5 of the vacuum breaker 4 of the first circuit 1 during a phase of closing of the vacuum breaker 4. The first transition instant t1' corresponds to the instant at which the mobile electrode 6' of the vacuum breaker 4' of the second circuit 2 comes into contact with the fixed electrode 5' of the vacuum breaker 4' of the first circuit 1 during a phase of closing of the vacuum breaker 4'.

In other words, these steps of the method are aimed at checking the synchronization of the closing of the first circuit 1 and of the second circuit 2. Ideal synchronization is obtained when the instants of closure of the two circuits are exactly identical. A small discrepancy between the first transition instant t1 and the first transition instant t1' means that the synchronization of the two circuits is satisfactory. In other words, the first circuit 1 and the second circuit 2 close at instants that are sufficiently closely spaced for the time shift between these instants of closure to allow the electrical unit 40 to operate nominally. The time shift between the first transition instant t1 and the first transition instant t1' is thus less than the acceptable maximum value defined by an applicable standard. Conversely, too great a discrepancy between the first transition instant t1 and the first transition instant t1' indicates that the first circuit 1 and the second circuit 2 have abnormal synchronization. In other words, the discrepancy between the first transition instant t1 and the first transition instant t1' is in that case too great to allow nominal operation of the electrical unit 40. The operation of the unit therefore does not conform to the applicable standard. Such a discrepancy indicates downgraded operation of the electrical unit 40, at least during the circuit-closure phases.

For each of the circuits 1, 2, the mobile electrode 6, 6' comprises an upper end which is the end facing toward the fixed electrode 5, 5'. The mobile electrode 6, 6' comprises a lower end which is the opposite end to the upper end. For each circuit 1, 2, the position measuring device 11, 11' is configured to measure the relative distance D-r between the control device 7, 7' and the lower end of the mobile electrode 6, 6'.

The first predetermined threshold s1 is comprised between 22.5% and 25% of an electrical network voltage variation period. The first predetermined threshold s1 is comprised between 4.5 milliseconds and 5.0 milliseconds when the frequency of the electrical network is 50 hertz. The network voltage period then has the value 20 milliseconds. The first predetermined threshold s1 is comprised between 3.75 milliseconds and 4.17 milliseconds when the frequency of the electrical network is 60 hertz. The period then has the value of around 16.66 milliseconds.

Figure 2:
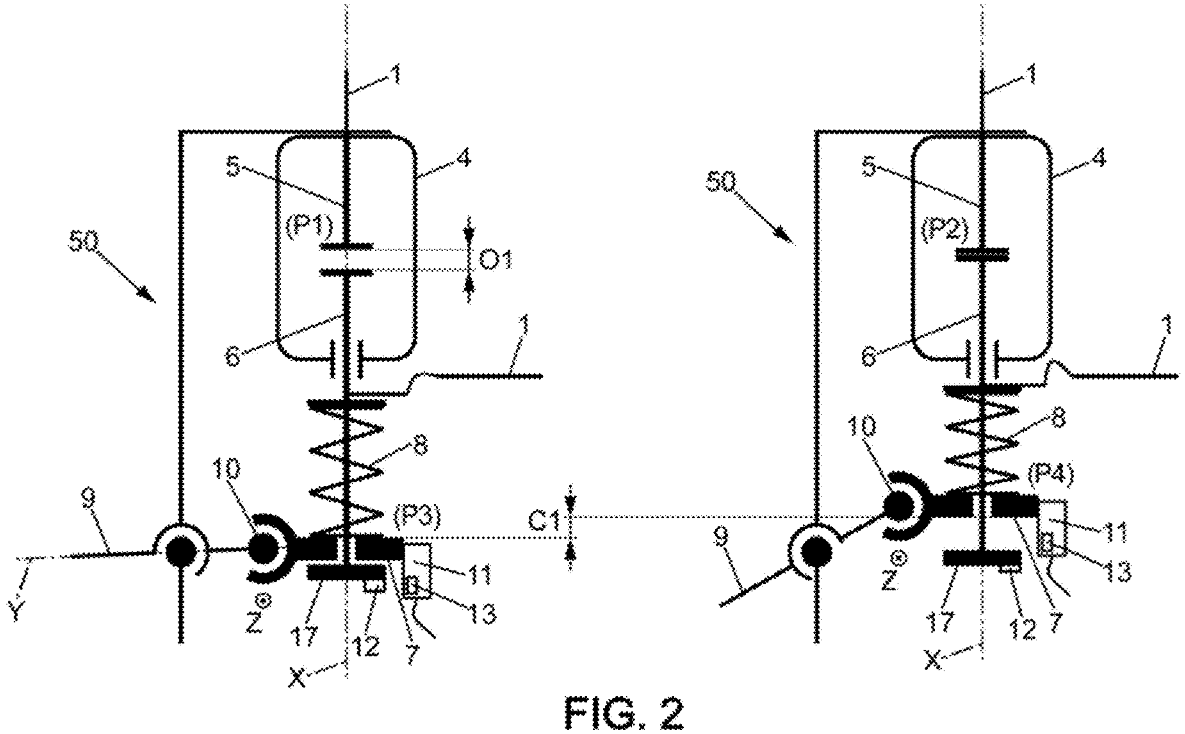
FIG. 2 is a detailed view of one pole of a switching device, in the opened position and in the closed position.

The switching device 50 is detailed in FIG. 2.

The fixed electrode 5, 5' and the mobile electrode 6, 6' are distant by a distance O1, O1' when the mobile electrode 6, 6' is in the position P1, P1' of maximum opening. This distance O1 of maximum separation of the fixed electrode 5 with respect to the mobile electrode 6 is comprised between 8 and 20 millimetres. Likewise, the distance O1' of maximum separation of the fixed electrode 5' with respect to the mobile electrode 6' is comprised between 8 and 20 millimetres. The fixed electrode 5 and the mobile electrode 6 are in contact when the mobile electrode 6 is in the closed position P2. Likewise, the fixed electrode 5' and the mobile electrode 6' are in contact when the mobile electrode 6' is in the closed position P2'. In other words, the distance between the mobile electrode 6, 6' and the fixed electrode 5, 5' is nil when the mobile electrode 6, 6' and the fixed electrode 5, 5' are in contact. The mobile electrode 6 of the vacuum breaker 4 is mobile with the ability to move translationally along a longitudinal axis X. The mobile electrode 6 and the fixed electrode 5 are coaxial, of axis X. What is meant by the axis of the vacuum breaker 4 is the longitudinal axis X that the mobile electrode 6 and the fixed electrode 5 have in common. Likewise, the mobile electrode 6' and the fixed electrode 5' are coaxial, of axis X'. The relative distance D-r between the control device 7, 7' and the mobile electrode 6, 6' is measured along the longitudinal axis X, X' of the mobile electrode 6, 6'.

The control device 7, 7' is configured to cause the mobile electrode 6, 6' to pass selectively from the position P1, P1' of maximum opening to the closed position P2, P2' and from the closed position P2, P2' to the position P1, P1' of maximum opening. The control device 7, 7' here is rigidly connected to the mobile electrode 6, 6'

The elastic return device 8, 8' is interposed in the mechanical linkage between the control device 7, 7' and the mobile electrode 6, 6'. The elastic return device 8, 8' is rigidly connected on the one hand to the control device 7, 7' and rigidly connected on the other hand to the mobile electrode 6, 6'. Rigid intermediate elements may form part of the mechanical linkage between the control device 7, 7' and the mobile electrode 6, 6'. The elastic return device 8, 8' is free to deform according to the forces applied to the control device 7, 7' and to the mobile electrode 6, 6'. The elastic return device 8 here is a spring. More specifically, the elastic return device 8 here is a helical spring. The helical spring 8 here works in compression. Thus, the length of the spring 8 during use of the switching device 50 is always less than the length of the spring 8 when it is in the free state. What is meant by the free state is that no end of the spring 8 is receiving or applying force. The compression of the spring 8, 8' notably ensures that the vacuum breaker opens sufficiently quickly, as needed for extinguishing the arc as the fixed and mobile electrodes part on opening.

The control device 7, 7' is able to move between:

- a first extreme position P3 in which the mobile electrode 6 is in the position P1 of maximum opening, the mobile electrode 6 and the fixed electrode 5 then being distant by an opening distance O1, and
- a second extreme position P4 in which the mobile electrode 6 and the fixed electrode 5 are in contact, a movement from the first extreme position P3 to the second extreme position P4 defining a travel C1 of the control device 7, and the travel C1 of the control device 7, 7' is greater than the opening distance O1, O1' so that the elastic return device 8, 8' is compressed when the control device 7 is in the second extreme position P4.

During the closing travel of the vacuum breaker 4, once the mobile electrode 6 and the fixed electrode 5 are in contact, the control device 7 continues to move and deforms the elastic return device 8 until it reaches its second extreme position P4. The potential energy stored by the elastic return device 8 during the closing phase is then released during the opening phase of the vacuum breaker 4, thus increasing the kinetic energy of the control device 7 during an opening travel of the vacuum breaker 4. The separation of the mobile electrode 6 and of the fixed electrode 5 is thus encouraged by the impulse supplied by the elastic return device 8. The performance of the switching device 50 is thus improved.

The elastic return device 8 may be in a prestressed state when the control device 7 is in the first extreme position P3. Thus, the overtravel of the control device 7 makes it possible, for a given amplitude of overtravel, to store even more potential energy. In addition, this preloaded state means that the inertia forces that need to be overcome in order to set in motion the collection of elements connected to the mobile electrode 6 do not cause the elastic return device 8 to deform before the mobile electrode 6 has come into contact with the fixed electrode 5.

The control device 7, 7' is connected to an actuating lever 9, 9' which is mobile, able to rotate about an axis Y. The direction of the axis of rotation Y of the actuating lever 9, 9' is perpendicular to the direction of the longitudinal axis X, X' of the vacuum breaker 4, 4'. The actuating lever 9, 9' is connected to the control device 7, 7' by a pivot 10, 10'. The pivot 10, 10' is secured to the control device 7, 7'. The pivot 10, 10' extends along an axis Z perpendicular to the longitudinal axis X and perpendicular to the direction of the axis of rotation Y of the actuating lever 9.

As schematically indicated in FIG. 1, each actuating lever 9, 9', 9" is connected to a control bar 14. A movement of the control bar 14 thus allows all the actuating levers to be moved jointly. The electrical unit 40 comprises three circuits 1, 2, 3 constructed in the same way. Each circuit corresponds to one distinct phase.

The position measurement of 11, 11' comprises a magnetic target 12 mechanically connected to the mobile electrode 6 and a position sensor 13 that senses the position of the magnetic target 12. The position sensor 13 is connected to the control device 7. The magnetic target 12 is, in the example depicted, rigidly connected to the mobile electrode 6. Likewise, the position sensor 13 is rigidly connected to the control device 7. The magnetic target 12 is, for example, a permanent magnet. The position sensor 13 is, for example, a Hall effect sensor or a magnetoresistive sensor. In the example of FIG. 2, the control device 7 is comprised, along the longitudinal axis X, between the elastic return device 8 and an end stop 17 which is rigidly connected to the mobile electrode 6. In the example depicted, the end stop 17 coincides with the lower end of the mobile electrode 6. In embodiment variants which have not been depicted, intermediate components may be present in the mechanical linkage between the end stop 17 and the mobile electrode 6. The position measuring device 11, 11' delivers an output signal which may be analogue or digital. The refresh rate of the output signal of the position measuring device 11, 11' may be constant. As a preference, the refresh rate is greater than 10 kHz. The electronic monitoring unit 15 acquires and processes the measurement signals. Because the duration of a phase of opening or of closing of a circuit is comprised between 5 and 50 milliseconds, such a sampling frequency produces a sufficient number of samples.

According to another embodiment, the position measuring device 11 may comprise an indicator rod connected to the mobile electrode 6. The indicator rod is electrically insulated. The indicator rod is made for example of epoxy resin or of polyester. The magnetic target 12 may be positioned at one axial end of the indicator rod. In the figures, the indicator rod has not been depicted. Other types of kinetic connection may be embodied, provided that they allow the measuring of a relative distance D-r between the control device 7, 7' and the mobile electrode 6, 6'.

Because the elastic return device 8 is interposed in the drive train between the control device 7 and the mobile electrode 6, the variation in the relative distance D-r between the control device 7 and the mobile electrode 6 is equal to the variation in length of the elastic return device 8.

As long as the mobile electrode 6 is distant from the fixed electrode 5, the degree to which the elastic return device 8 is compressed remains constant. This is because the elastic return device 8 presses the control device 7 against the end stop 17, as schematically indicated in part A of FIG. 2. The degree to which the elastic return device 8 is compressed can vary, during the command to close the vacuum breaker 4, only when the mobile electrode 6 and the fixed electrode 5 are in contact. When the compression of the elastic return device 8 varies, the control device 7 is separated from the end stop 17, as schematically indicated in part B of FIG. 2. Thus, the relative distance D-r between the control device 7 and the mobile electrode 6 can vary only when the mobile electrode 6 and the fixed electrode 5 are in contact. Analysis of the way in which the signal delivered by the position measuring device 11 that determines the relative distance D-r between the control device 7 and the mobile electrode 6 changes with respect to time makes it possible to determine the instant at which the mobile electrode 6 comes into contact with the fixed electrode 5. Comparing the evolution of the signal for each circuit 1,2 thus makes it possible to quantify the time shift between the instant of closure of the first circuit 1 and the instant of the closure of the second circuit 2. In other words, the quality of the synchronization of the closing and of the opening of the circuits 1, 2 can be checked during normal use of the electrical unit 40. There is no need to interrupt the normal use in order to perform diagnostic tests on the electrical unit 40. Neither is it necessary to add diagnostics-specific equipment. The method proposed uses position sensors that are already present for measuring the overtravel, and adds a further functionality. The additional cost of this further functionality is low, because the addition of a sensor is avoided. Such a position measuring device thus also allows the monitoring of the quality of the synchronization of opening and closing between the various circuits, the root cause of which may notably stem from the wearing of the contacts of the electrodes of the vacuum breaker during the course of use of the switching device.

Figure 3:
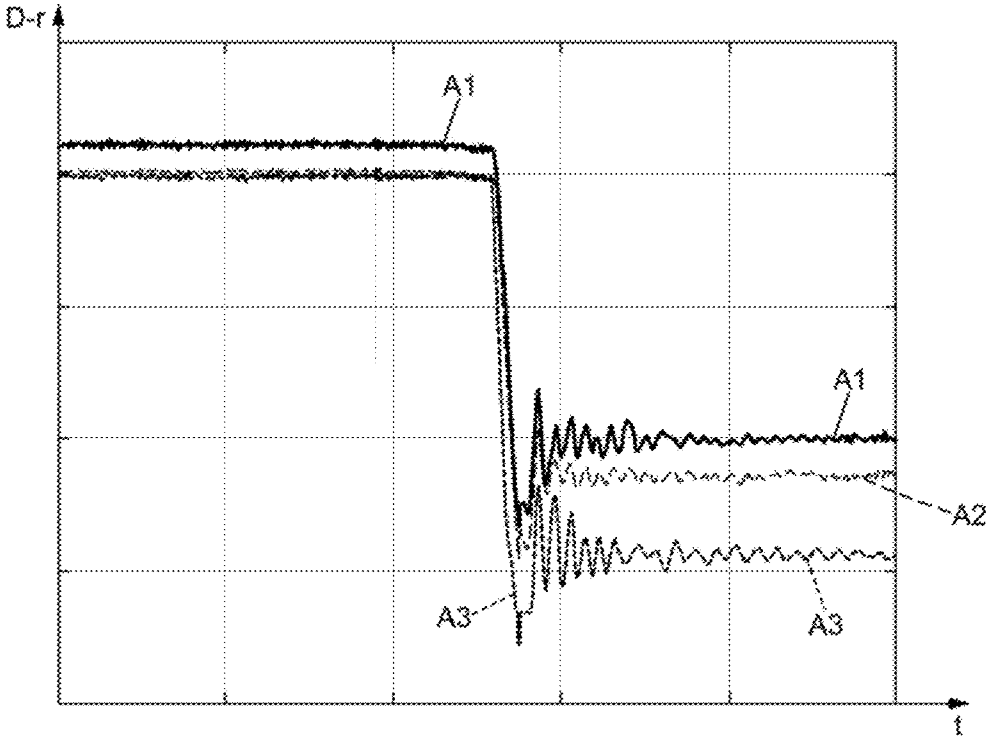
FIG. 3 is a depiction of how parameters of the method according to the invention evolve over time during a phase of closing of the switching device.

FIG. 3 illustrates the evolution with respect to time of the signal delivered by the position measuring device 11, for each of the three circuits 1, 2, 3, during a circuit closure travel. Curve A1 corresponds to the first circuit 1, curve A2 corresponds to the second circuit 2, and curve A3 corresponds to the third circuit 3. In the steady state, each of the curves exhibits fluctuations about a mean value. These fluctuations are due to the various measurement noise and sampling fluctuations. Depending on the configuration of the output signal from the position measuring device 11, the signal delivered may be an increasing function of the relative distance D-r between the control device 7 and the mobile electrode 6, or else may be a decreasing function. In the examples illustrated, the amplitude of the delivered signal decreases as the relative distance D-r between the control device 7 and the mobile electrode 6 decreases. The fluctuations visible in FIG. 3 correspond to the reactions of the elastic return device of each of the circuits as the electrodes of the vacuum breaker bang together.

Figure 4:
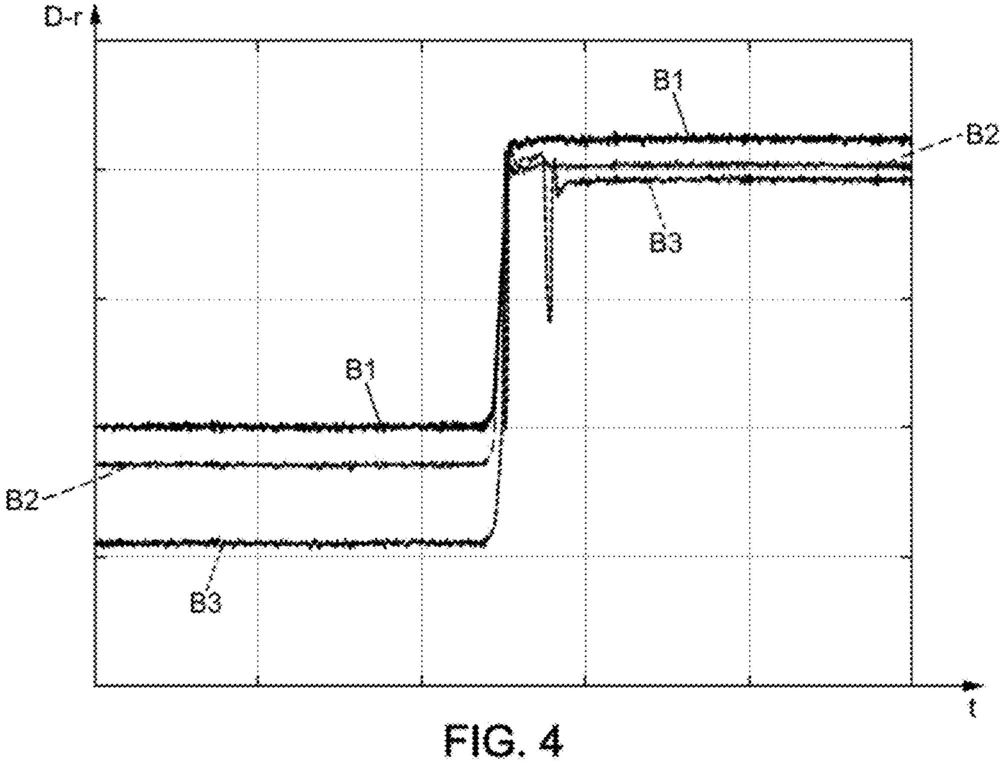
FIG. 4 is a depiction of how parameters evolve over time during a phase of opening of the switching device.

FIG. 4 illustrates the evolution with respect to time of the signal delivered by the position measuring device 11 for each of the three circuits 1, 2, 3 during a circuit opening travel. Curve B1 corresponds to the first circuit 1, curve B2 corresponds to the second circuit 2, and curve B3 corresponds to the third circuit 3.

The method further comprises the steps:

- for each of the first 1 and second 2 circuits, when the control device 7, 7' causes the mobile electrode 6, 6' to pass from the closed position P2, P2' to the open position P1, P1', determining a second transition instant t2, t2' at which the mobile electrode 6, 6' ceases to be in contact with the fixed electrode 5, 5',
- determining a difference delta2 between the second transition instant t2 of the first vacuum breaker 4 and the second transition instant t2' of the second vacuum breaker 4,
- determining that the operational status is a first status known as "nominal synchronization" if the difference delta2 is less than or equal to a second predetermined threshold s2,
- determining that the operational status is a second status known as "abnormal synchronization" if the difference delta2 is greater than the second predetermined threshold s2. (Step 51).

The second transition instant t2 corresponds to the instant at which the mobile electrode 6 ceases to be contact with the fixed electrode 5. Likewise, the second transition instant t2' corresponds to the instant at which the mobile electrode 6' ceases to be in contact with the fixed electrode 5'. The second transition instant t2, t2' may also be defined as the instant at which the mobile electrode 6, 6' leaves the closed position P2, P2'. In other words, the second transition instant corresponds to the instant at which each circuit starts to open. These steps of the method are aimed at checking the synchronization of the opening of the first circuit 1 and of the second circuit 2. As before, a small discrepancy between the second transition instant t2 and the second transition instant t2' means that there is satisfactory synchronization between the first circuit 1 and the second circuit 2. In that case, the first circuit 1 and the second circuit 2 open at instants that are sufficiently close for the time shift between these instants of opening to allow the electrical unit 40 to operate nominally. Conversely, too great a discrepancy between the second transition instant t2 and the second transition instant t2' means that the first circuit 1 and the second circuit 2 are abnormally synchronized in opening.

The second predetermined threshold s2 is comprised between 15.0% and 16.5% of an electrical network voltage variation period. The second predetermined threshold s2 is comprised between 3.0 milliseconds and 3.33 milliseconds when the frequency of the electrical network is 50 hertz. The second predetermined threshold s2 is comprised between 2.5 milliseconds and 2.78 milliseconds when the frequency of the electrical network is 60 hertz.

Details will now be given of a first way of determining, for each circuit, the first transition instant and the second transition instant.

To do that, the method further comprises the steps:

- for each circuit 1, 2 successively acquiring a set of samples x1, . . . xn of the relative distance D-r between the control device 7, 7' and the mobile electrode 6, 6',
- determining the mean M, M' and the standard deviation Ect, Ect' of the set of samples acquired,
- determining an absolute value Dev, Dev' of the difference between the last sample acquired xn, xn' and the determined mean M, M',
- determining the quotient Q, Q' of the determined difference Dev, Dev' and of the determined standard deviation Ect, Ect',
- determining an instant, known as threshold instant ts, ts', at which the determined quotient Q, Q' becomes greater than a third predetermined threshold s3. (Step 52)

Figure 5:
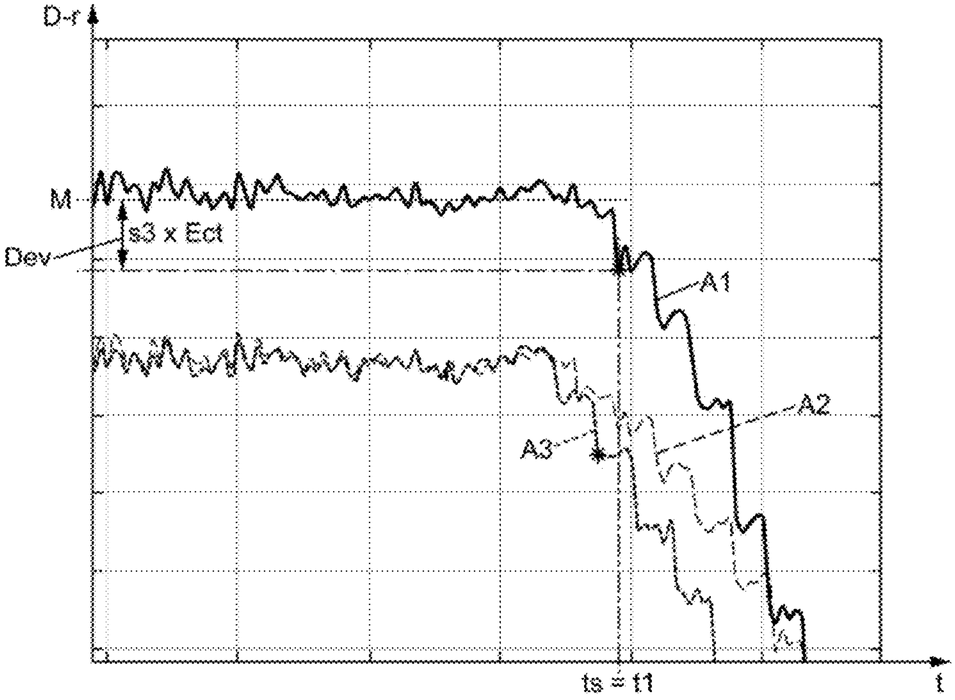
FIG. 5 is a schematic depiction of how parameters of a first embodiment of the method according to the invention evolve over time during a phase of closing of the switching device.

These steps are detailed in FIG. 5. Curve A1 in FIG. 5 illustrates the evolution with respect to time of the relative distance D-r between the control device 7 and the mobile electrode 6 during a closing travel for closing the circuit 1. Curve A2 illustrates the same parameter, plotted for the second circuit 2, and curve A3 corresponds to the same parameter, for the third circuit 3. The time scale for FIG. 5 is expanded in relation to FIGS. 3 and 4, so as to integrate in greater detail how the various signals evolve with respect to time.

During the opening of each circuit, the relative distance D-r between the control device 7 and the mobile electrode 6 changes. This phase corresponds to the reduction in amplitude of the delivered signal. Monitoring how the delivered signal deviates from its mean value allows a measurement fluctuation to be differentiated from a drifting of the signal as a result of the triggering of a circuit closure phase.

The sign of the determined difference changes according to whether the control device 7 is causing the mobile electrode 6 to pass from the open position P1 to the closed position P2 or else whether the control device 7 is causing the mobile electrode 6 to pass from the closed position P2 to the open position P1. Using the absolute value Dev, Dev' of the difference between the last sample acquired xn, xn' and the determined mean M, M' means that the same method could be used both for opening phases and for closing phases.

The third predetermined threshold s3 is greater than 7. The third predetermined threshold s3 is for example equal to 8. These values for the third predetermined threshold s3 make it possible to ensure that normal fluctuations of the output signal of the position measuring device 11 do not cross the threshold s3. Specifically, in the steady state, the measurement samples have a substantially normal distribution and a difference of more than 7 standard deviations between a sample and the mean of the sample cannot be attributed to normal fluctuations of the measurement signals. The crossing of the threshold value therefore does indeed indicate a true change in the relative distance D-r between the control device 7 and the mobile electrode 6, indicating the start of a change-in-state phase. What is meant by a steady state is a state corresponding either to the circuit being continuously closed or to the circuit being continuously open.

According to a first embodiment, the method comprises the step:

attributing the value of the threshold instant ts, ts' to the first transition instant t1, t1'. (Step 53)

In other words, for each circuit 1, 2, the instant ts at which the instantaneous signal for the relative distance D-r between the control device 7 and the mobile electrode 6 becomes sufficiently far removed by a sufficient number of standard deviations is taken to be the first transition instant t1, namely to be the instant marking the start of the phase of transition between the switching device 50 being open and being closed. The time shift between the transition instants t1, t1' thus determined are then used to determine the operational status of the switching device 50, as described earlier.

According to a second embodiment, the transition instant is calculated in a different way. For that, the method further comprises the step:

determining an equation of a first regression curve R1 for all of the samples acquired between an instant corresponding to the threshold instant ts minus a first predetermined duration dp1, and an instant corresponding to the threshold instant ts. (Step 54)

The method further comprises the step:

determining an equation of a second regression curve R2 for all of the samples acquired between an instant corresponding to the threshold instant ts, and an instant corresponding to the threshold instant ts plus a second predetermined duration dp2. (Step 55)

Figure 6:
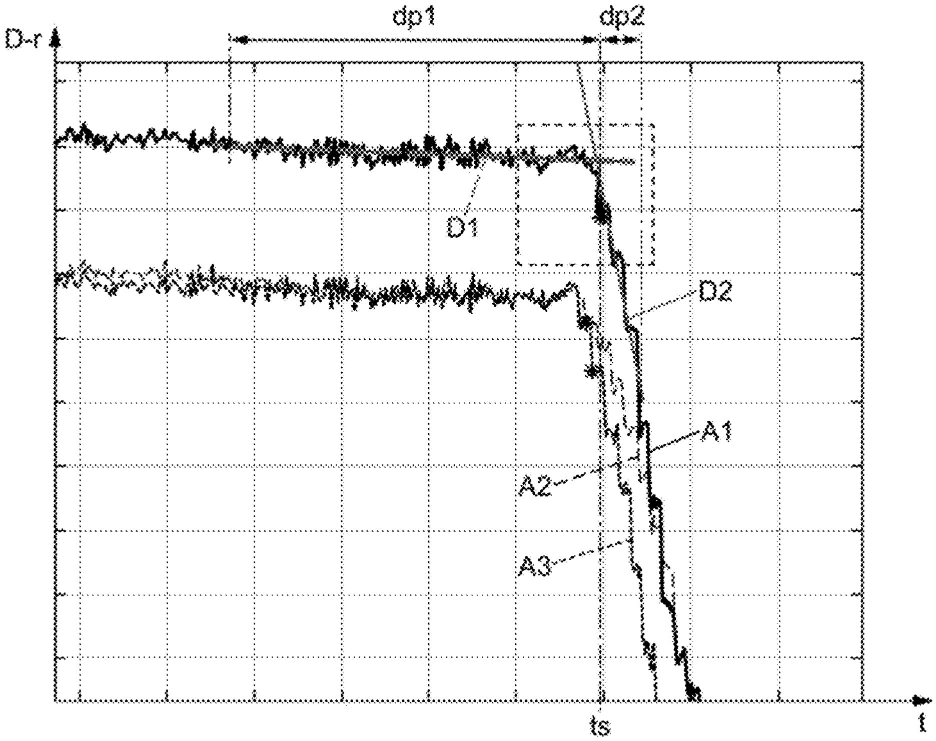
FIG. 6 is a schematic depiction of how parameters of a second embodiment of the method according to the invention evolve over time during a phase of closing of the switching device.

The first predetermined duration dp1 is comprised between 8 milliseconds and 12 milliseconds, and preferably equal to 10 milliseconds. In the example of FIG. 6, the first regression curve R1 is a first linear regression line D1. The first linear regression line D1 is an equation for the relative distance D-r between the control device 7 and the mobile electrode 6 as a function of time, valid over the time range comprised between the threshold instant ts minus the first predetermined duration dp1, and the threshold instant ts.

The second predetermined duration dp2 is comprised between 0.8 milliseconds and 1.2 milliseconds, and preferably equal to 1 millisecond. In the example of FIG. 6, the second regression curve R2 is a second linear regression line D2. The second linear regression line D2 is an equation for the relative distance D-r between the control device 7 and the mobile electrode 6 as a function of time. This equation is valid over a time range comprised between the threshold instant ts and the threshold instant ts plus the second predetermined duration dp2. Other types of regression curve than a linear regression straight line can be used, without altering the principle behind this step of the method.

The method further comprises the steps:

determining an instant tc known as crossover instant, corresponding to the instant at which the first regression curve C1 intercepts the second regression curve C2, attributing the value of the crossover instant tc to the first transition instant t1. (Step 56)

Figure 7:
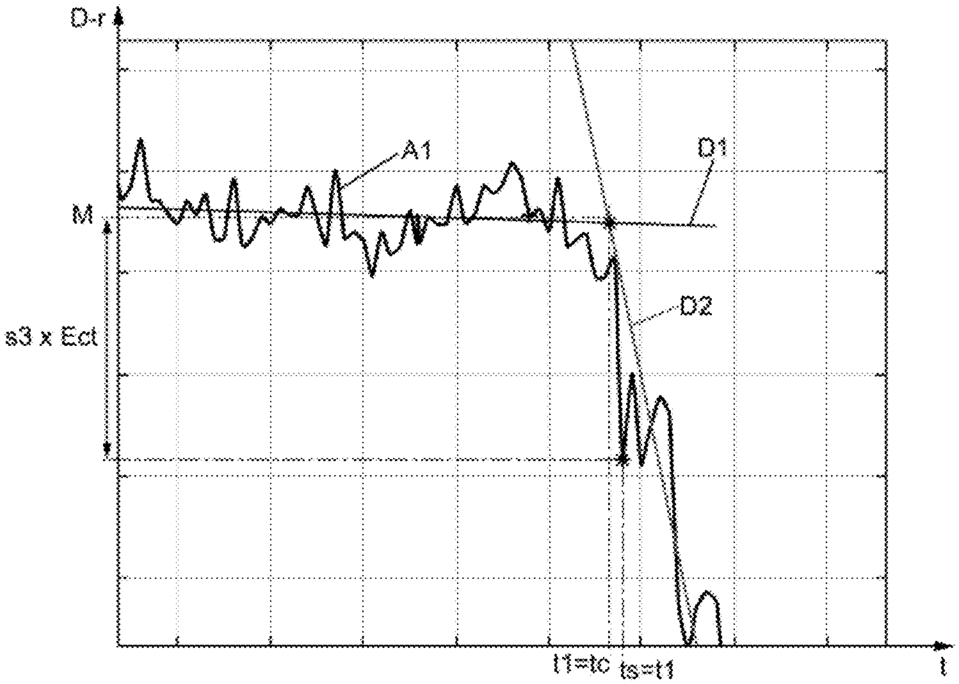
FIG. 7 is a schematic depiction comparing the first and second embodiments during a phase of closing of the switching device.

In the second embodiment, the transition instant value calculated beforehand from the discrepancy between the instantaneous signal and the averaged signal is used to model two linear regression straight lines D1, D2. Each regression line D1, D2 applies to a given time interval, the two time intervals partially overlapping. The instant tc at which the two modelled straight lines D1 and D2 intercept is considered in this embodiment to be the start t1 of the phase of transition between the switching device being open and it being closed. As with the first embodiment, the time shift between the transition instants t1, t1' thus determined is then used to determine the operational status of the switching device 50. In order to simplify FIG. 6, the two regression straight lines D1, D2 have been plotted for curve A1 only. The same processing is also performed for curve A2, but this has not been plotted. FIG. 7 shows the difference between the results obtained by each of the two methods set out. FIG. 7 is an enlargement of the zone enclosed by dotted lines in FIG. 6. The discrepancy between the value ts, determined by the first method, and the value tc, determined by the second method, is visible in FIG. 7. The second method provides more accurate results but takes more calculation. The calculations implemented by the method can be performed in real time, or with a delay.

The steps in the method for analysing the time shift between two distinct phases have been described. The method may be generalized to three distinct phases. The transition instants for each of the three phases are then compared in pairs.

Thus there is a method for determining an operational status of a switching device 50 for switching an electrical unit 40 comprising a first circuit 1 connected to a first phase of an electrical network, a second circuit 2 connected to a second phase of the electrical network, and a third circuit 3 connected to a third phase of the electrical network, each circuit 1, 2, 3 comprising:

a vacuum breaker 4, 4', 4" placed in series in the circuit, the vacuum breaker comprising a fixed electrode 5, 5', 5" and a mobile electrode 6, 6', 6" able to move between a position P1, P1', P1" of maximum opening and a closed position P2, P2', P2", a control device 7, 7', 7" kinematically connected to the mobile electrode 6, 6', 6" by an elastic return device 8, 8', 8", the method comprising the steps:

for each of the first 1, second 2 and third 3 circuits, when the control device 7, 7', 7" causes the mobile electrode 6, 6', 6" to pass from the open position P1, P1', P1" of maximum opening to the closed position, determining a first transition instant t1, t1', t1" at which the mobile electrode 6, 6', 6" comes into contact with the fixed electrode 5, 5', 5", determining a first difference delta1 between the first transition instant t1 of the vacuum breaker 4 of the first circuit 1 and the first transition instant t1' of the vacuum breaker 4' of the second circuit 2, determining a second difference delta1' between the first transition instant t1' of the vacuum breaker 4' of the second circuit 2 and the first transition instant t1" of the vacuum breaker 4" of the third circuit 3, determining a third difference delta1" between the first transition instant t1" of the vacuum breaker 4" of the third circuit 3 and the first transition instant t1 of the vacuum breaker 4 of the first circuit 1, determining that the operational status is a first status known as "normal synchronization" if the first difference delta1, the second difference delta2 and the third difference delta3 are all less than or equal to a first predetermined threshold s1, determining that the operational status is a second status known as "abnormal synchronization" if at least one of the first difference delta1, second difference delta2 and third difference delta3 is greater than the first predetermined threshold s1.

In the position P1, P1', P1" of maximum opening, the fixed electrode 5, 5', 5" and the mobile electrode 6, 6', 6" are distant. In the closed position P2, P2', P2", the fixed electrode 5, 5', 5" and the mobile electrode 6, 6', 6" are in contact. The control device 7, 7', 7" is configured to cause the mobile electrode 6, 6', 6" to pass selectively from the position P1, P1', P1" of maximum opening to the closed position P2, P2', P2" and from the closed position P2, P2', P2" to the position P1, P1', P1".

Figure 8:
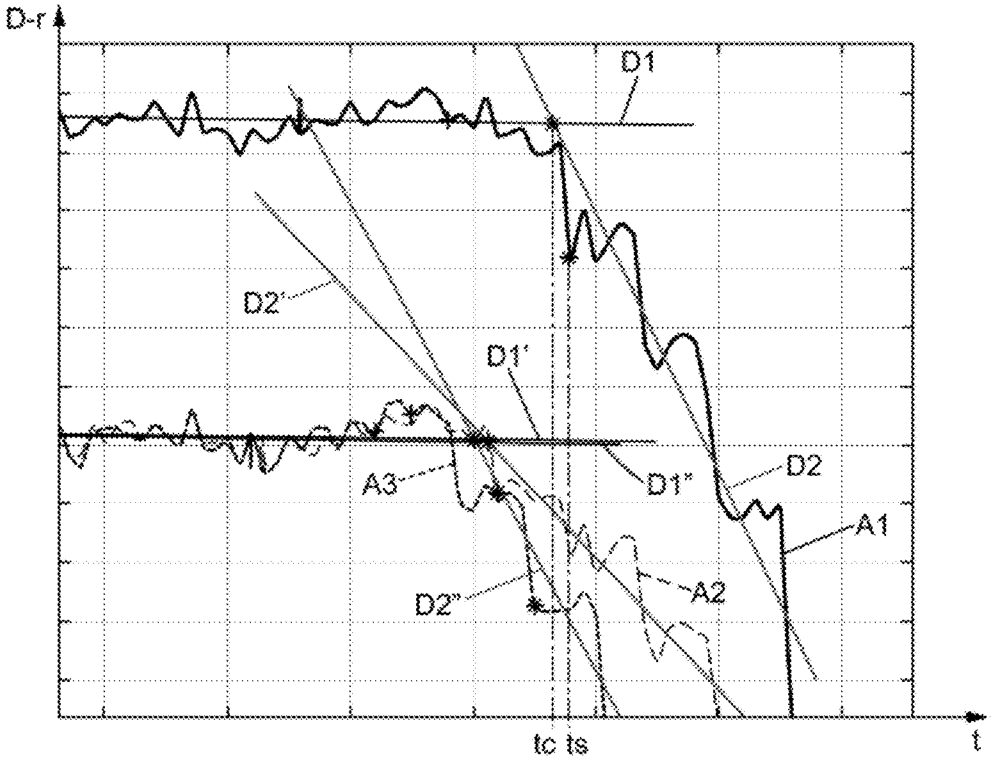
FIG. 8 is another view illustrating the second embodiment of the method, during the phase of closing of the switching device.
Figure 9:
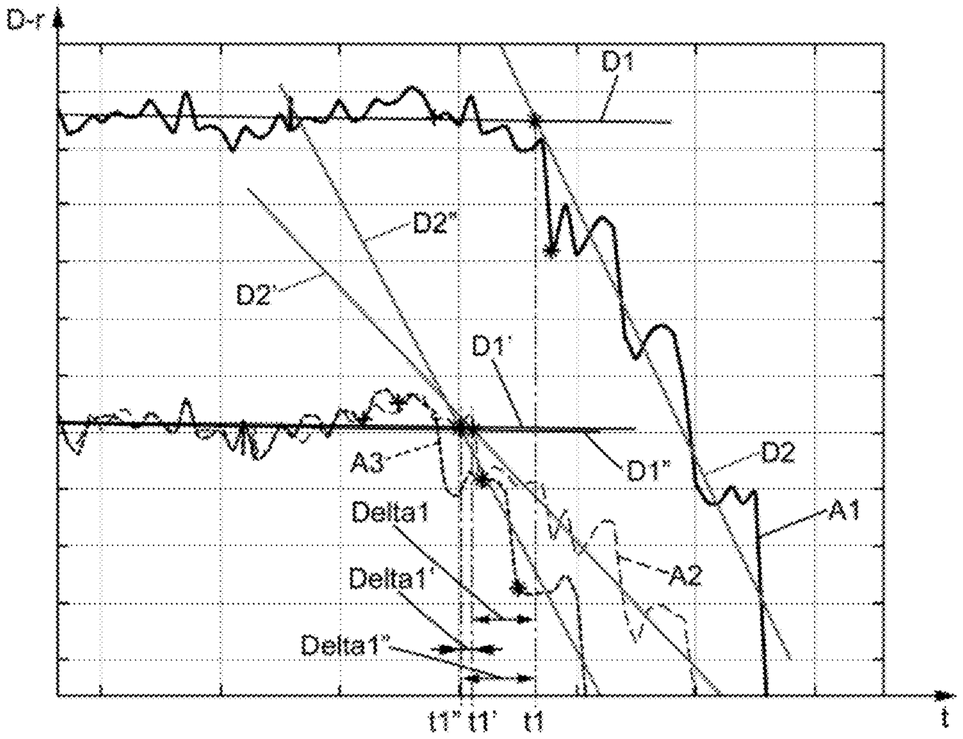
FIG. 9 is yet another view illustrating the second embodiment of the method, during a phase of closing of the switching device.

FIGS. 8 and 9 illustrate the various parameters. These steps make it possible to determine the operational status of a switching device switching three distinct phases of an electrical network, during the closing of three circuits 1, 2, 3 corresponding to these three phases. The operational status is nominal if the three time shifts determined are all less than a predetermined threshold. The operational status is abnormal as soon as at least one of the three time shifts is greater than the acceptable threshold.

FIG. 9 illustrates the transition instants determined for each of the three circuits, as well as the differences between these transition instants. In the example of FIG. 9, the instants t1' and t1" are very close. The time shift delta1' is thus less than the threshold s1. The instant t1 is shifted in time with respect to the instants t1' and t1". The time shifts delta1 and delta1" are greater than the threshold s1.

To complement this, the operational status can be determined also on the opening of the three circuits.

For that, the method further comprises the steps:

for each of the first 1, second 2 and third 3 circuits, when the control device 7, 7', 7" causes the mobile electrode to move from the closed position P2, P2', P2" to the open position P1, P1', P1", determining a second transition instant t2, t2', t2" at which the mobile electrode 6, 6', 6" ceases to be in contact with the fixed electrode 5, 5', 5", determining a fourth difference delta2 between the second transition instant t2 of the vacuum breaker 4 of the first circuit 1 and the second transition instant t2' of the vacuum breaker 4' of the second circuit 2, determining a fifth difference delta2' between the second transition instant t2' of the vacuum breaker 4' of the second circuit 2 and the second transition instant t2" of the vacuum breaker 4" of the third circuit 3, determining a sixth difference delta2" between the second transition instant t2" of the vacuum breaker 4" of the third circuit 3 and the second transition instant t2 of the vacuum breaker 4 of the first circuit 1, determining that the operational status is a first status known as a "nominal synchronization" if the fourth difference delta2, the fifth difference delta2' and the sixth difference delta2" are all less than or equal to a first predetermined threshold s1, determining that the operational status is a second status known as "abnormal synchronization" if at least one of the fourth difference delta2, fifth difference delta2' and sixth difference delta2" is greater than the first predetermined threshold s1.

Figure 10:
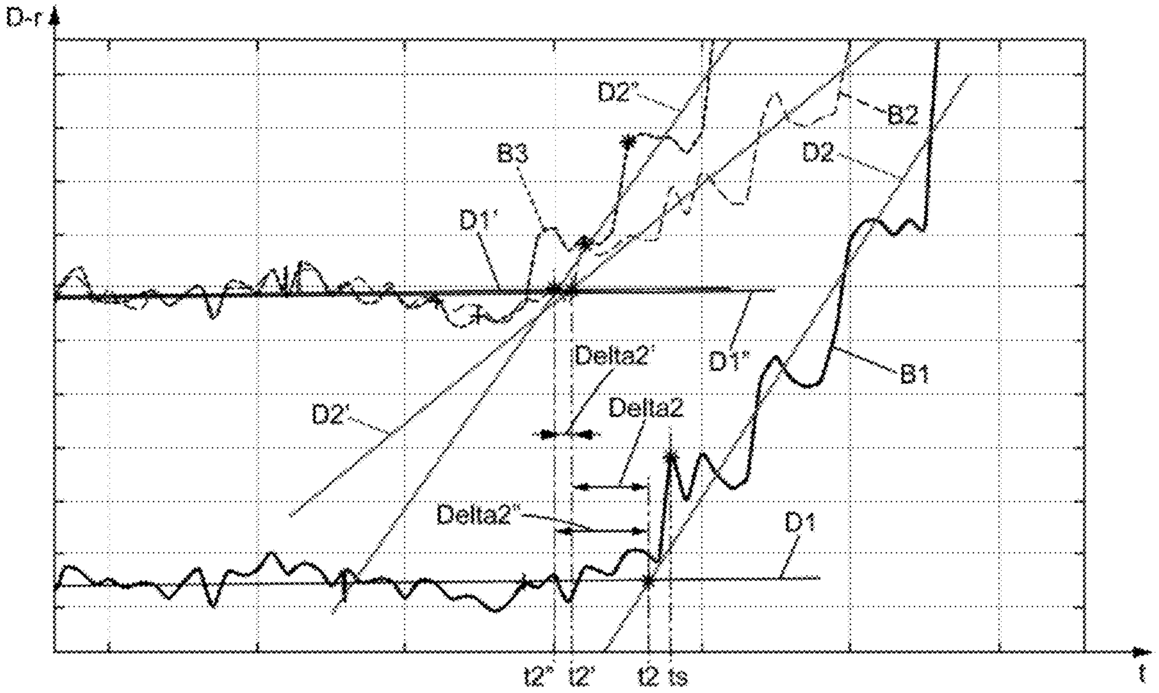
FIG. 10 is another view illustrating the second embodiment of the method, during a phase of opening of the switching device.
Figure 11:
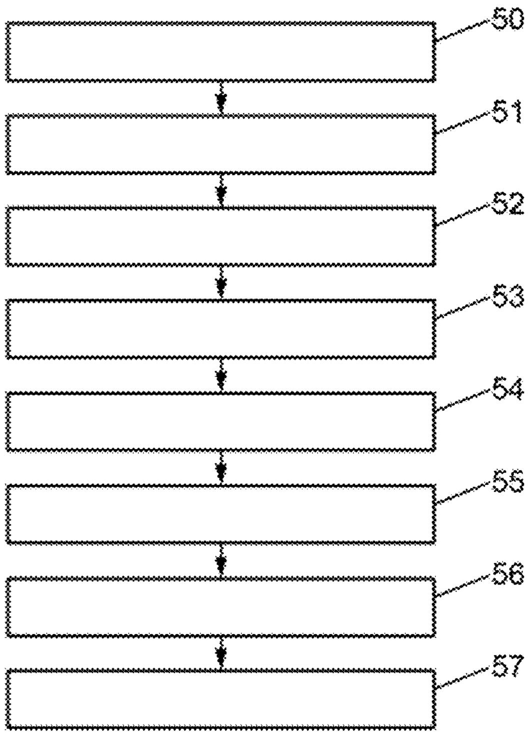
FIG. 11 is a block diagram illustrating various steps of the method according to the invention.

FIG. 10 depicts, for each of the three circuits, the first linear regression line and the second linear regression line. The second transition time t2, t2', t2" corresponding respectively to each of the three circuits is also indicated, as are the differences delta2, delta2', delta2" between the transition times. The operational status can thus be determined.

According to one embodiment, the method further comprises the step:

if the determined operational status is the second status known as "abnormal synchronization", emitting an alert signal. (Step 57)

The alert signal emitted may be the displaying of a message on a monitoring screen, or the illuminating of a light indicator, or the emission of an audible signal. This step is just as applicable to determining an operational status of a switching device 50 comprising two circuits as it is to a switching device comprising three circuits.

The alert received allows an operator to instigate a corrective intervention on the switching device 50 and avoid allowing the electrical unit 40 to operate under abnormal conditions that could lead to failures.

The invention claimed is:

1. A method for determining an operational status of a switching device for switching an electrical unit comprising a first circuit connected to a first phase of an electrical network and a second circuit connected to a second phase of the electrical network, each circuit respectively comprising:

a vacuum breaker placed in series in the circuit, the vacuum breaker comprising a fixed electrode and a mobile electrode able to move between a position of maximum opening and a closed position, a control device kinematically connected to the mobile electrode (6, 6') via an elastic return device, wherein each circuit comprises a position measuring device configured to measure a relative distance between the control device and the mobile electrode, the method comprising:

for each of the first and second circuits, when the control device causes the mobile electrode to pass from the position of maximum opening to the closed position, determining, from measurements of the relative distance between the control device and the mobile electrode a first transition instant at which the mobile electrode comes into contact with the fixed electrode, determining a difference between the first transition instant of a first vacuum breaker and the first transition instant of a second vacuum breaker, determining that the operational status is a first status known as "nominal synchronization" if the difference is less than or equal to a first determined threshold, determining that the operational status is a second status known as "abnormal synchronization" if the difference is greater than the first predetermined threshold.

2. The method according to claim 1, further comprising:

for each of the first and second circuits, when the control device causes the mobile electrode to pass from the closed position to the open position, determining a second transition instant at which the mobile electrode ceases to be in contact with the fixed electrode, determining a difference between the second transition instant of the first vacuum breaker and the second transition instant of the second vacuum breaker, determining that the operational status is a first status known as "nominal synchronization" if the difference is less than or equal to a second predetermined threshold, determining that the operational status is a second status known as "abnormal synchronization" if the difference is greater than the second predetermined threshold.

3. The method according to claim 1, wherein the first predetermined threshold is comprised between 22.5% and 25% of an electrical network voltage variation period.

4. The method according to claim 1, further comprising:

for each circuit successively acquiring a set of samples of the relative distance between the control device and the mobile electrode, determining a mean and a standard deviation of the set of samples acquired, determining an absolute value of a difference between a last sample acquired and the determined mean, determining a quotient of the determined absolute value and of the determined standard deviation, determining an instant, known as threshold instant, at which the determined quotient becomes greater than a third predetermined threshold.

5. The method according to claim 4, comprising:

attributing a value of the threshold instant to the first transition instant.

6. The method according to claim 4, further comprising:

determining an equation of a first regression curve for all of the samples acquired between an instant corresponding to the threshold instant minus a first predetermined duration, and an instant corresponding to the threshold instant.

7. The method according to claim 6, wherein the first predetermined duration is comprised between 8 ms and 12 ms, and wherein the first regression curve is a first linear regression line.

8. The method according to claim 7, wherein the first predetermined duration is equal to 10 ms.

9. The method according to claim 6, further comprising:

determining an equation of a second regression curve for all of the samples acquired between an instant corresponding to the threshold instant, and an instant corresponding to the threshold instant plus a second predetermined duration.

10. The method according to claim 9, wherein the second predetermined duration is comprised between 0.8 ms and 1.2 ms, and wherein the second regression curve is a second linear regression line.

11. The method according to claim 10, wherein the second predetermined duration is equal to 1 ms.

12. The method according to claim 9, further comprising:

determining an instant known as crossover instant, corresponding to the instant at which the first regression curve intercepts the second regression curve, attributing a value of the crossover instant to the first transition instant.

13. The method according to claim 1, further comprising:

if the determined operational status is the second status known as "abnormal synchronization", emitting an alert signal.

14. An assembly comprising:

a switching device for switching an electrical unit comprising a first circuit connected to a first phase of an electrical network and a second circuit connected to a second phase of the electrical network, each circuit respectively comprising:

a vacuum breaker placed in series in the circuit, the vacuum breaker comprising a fixed electrode and a mobile electrode able to move between a position of maximum opening and a closed position, a control device kinematically connected to the mobile electrode via an elastic return device, an electronic monitoring unit configured to implement the method according to claim 1.

* * * * *